United States Patent
Akechi

(10) Patent No.: US 10,132,030 B2
(45) Date of Patent: Nov. 20, 2018

(54) FABRIC FOR AIRBAG

(71) Applicant: Toyobo Co., Ltd., Osaka (JP)

(72) Inventor: Tsutomu Akechi, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 390 days.

(21) Appl. No.: 14/777,828

(22) PCT Filed: Mar. 18, 2014

(86) PCT No.: PCT/JP2014/057232
§ 371 (c)(1),
(2) Date: Sep. 17, 2015

(87) PCT Pub. No.: WO2014/148459
PCT Pub. Date: Sep. 25, 2014

(65) Prior Publication Data
US 2016/0273157 A1    Sep. 22, 2016

(30) Foreign Application Priority Data

Mar. 19, 2013   (JP) ................................. 2013-056180

(51) Int. Cl.
| | |
|---|---|
| *B60R 21/235* | (2006.01) |
| *D06M 15/59* | (2006.01) |
| *D03D 1/02* | (2006.01) |
| *D06M 15/263* | (2006.01) |
| *D06M 15/507* | (2006.01) |
| *D06M 15/564* | (2006.01) |
| *D06N 3/12* | (2006.01) |
| *D06N 3/04* | (2006.01) |
| *D06N 3/14* | (2006.01) |
| *D06M 101/34* | (2006.01) |

(52) U.S. Cl.
CPC ........... *D06M 15/59* (2013.01); *B60R 21/235* (2013.01); *D03D 1/02* (2013.01); *D06M 15/263* (2013.01); *D06M 15/507* (2013.01); *D06M 15/564* (2013.01); *D06N 3/042* (2013.01); *D06N 3/123* (2013.01); *D06N 3/125* (2013.01); *D06N 3/14* (2013.01); *B60R 2021/23514* (2013.01); *B60R 2021/23519* (2013.01); *D06M 2101/34* (2013.01); *D06M 2200/30* (2013.01); *D06N 2209/067* (2013.01); *D06N 2209/12* (2013.01); *D06N 2211/268* (2013.01); *D06N 2213/02* (2013.01)

(58) Field of Classification Search
None
See application file for complete search history.

(56) References Cited

U.S. PATENT DOCUMENTS

| | | |
|---|---|---|
| 5,897,929 A | 4/1999 | Li et al. |
| 5,945,186 A | 8/1999 | Li et al. |
| 5,980,660 A | 11/1999 | Moriwaki et al. |
| 6,291,040 B1 | 9/2001 | Moriwaki et al. |
| 2003/0060103 A1 | 3/2003 | Nagaoka et al. |
| 2009/0247030 A1 | 10/2009 | Kano et al. |
| 2011/0014833 A1 | 1/2011 | Hagiwara et al. |
| 2013/0295810 A1 | 11/2013 | Matsui et al. |

FOREIGN PATENT DOCUMENTS

| | | |
|---|---|---|
| CN | 1159402 | 9/1997 |
| EP | 2028315 | 2/2009 |
| JP | 11-60667 | 3/1999 |
| JP | 2001-287609 | 10/2001 |
| JP | 2001/329468 | 11/2001 |
| JP | 2001-524624 | 12/2001 |
| JP | 2002-327350 | 11/2002 |
| JP | 2003-183983 | 7/2003 |
| JP | 2005-330646 | 12/2005 |
| JP | 2010-285703 | 12/2010 |
| JP | 2011/168131 | 9/2011 |
| JP | 2012-148727 | 8/2012 |
| WO | 2009/139087 | 11/2009 |

OTHER PUBLICATIONS

European Patent Office; Extended European Search Report in European Application No. 14768543.2 (dated Oct. 20, 2016).
Japanese Patent Office, International Search Report for Application No. PCT/JP2014/057232, dated Jun. 17, 2014.
Office Action in Chinese application No. 201480012823.4 (dated Aug. 2, 2016) and its English translations.
Office Actions in Chinese application No. 201480012823.4 (dated Apr. 24, 2017) and its English translations.
Office Actions in Chinese application No. 201480012823.4 (dated Nov. 6, 2017) and its English translations.
European Patent Office; Communication dated Sep. 17, 2018 in corresponding European Application No. 14 768 543.2 (4 pages).

*Primary Examiner* — Arti Singh-Pandey
(74) *Attorney, Agent, or Firm* — Fish & Richardson P.C.

(57) ABSTRACT

[Problem] The purpose of the present invention is to provide a base fabric for an airbag which has a low initial air permeability, an excellent flammability, and in addition a small amount of thread fraying when the fabric is cut with a knife or sewn, even with a small amount of coating, [Solution] Provided is a base fabric for an airbag comprising a coated fabric wherein resin compositions are applied to at least one side of a textile, wherein the coating amount of the resin composition applied to the one side of the textile is 0.1 to 10 $g/m^2$ in terms of a mass after drying, an air permeability under a differential pressure of 100 kPa is 0.05 $L/cm^2/min$ or less, a flammability measured in accordance with FMVSS302 is self-extinguishing, and the number of frayed thread at the end part after 100 repetitions of a scrub test in accordance with ISO5981 is 5 or less.

7 Claims, No Drawings

FABRIC FOR AIRBAG

TECHNICAL FIELD

The present invention relates to a coated fabric used for an airbag for vehicles. More particularly, the present invention relates to a base fabric for an airbag that, even with a small amount of coating, has a low initial air permeability, an excellent flammability, and a small amount of thread fraying when the fabric is cut with a knife or sewn.

BACKGROUND ART

Airbags for vehicles are intended to protect an occupant's body such as a face, head and the like in the event of a crash by actuating a sensor following an impact, generating a high-temperature and high-pressure gas, and instantaneously inflating an airbag with this gas. In recent years, airbags for vehicles have been widely used as one of safety devices and have been developed in their practical use not only for a driver seat and a passenger seat but also as knee airbags, side airbags, curtain airbags, etc., and installment of a plurality of airbags is now becoming common.

In side airbags, curtain airbags, etc. for which an internal pressure retention performance is particularly required, a coated woven fabric coated with a synthetic rubber such as silicone has been used because its heat resistance, air insulating property (low air permeability) and flame-retardancy are high. In recent years, the amount of coating is desired to be reduced from the viewpoint of weight reduction and improvement of package ability of airbags.

In general, airbags are cut by cutting methods such as knife cutting, melt cutting with a laser, or the like. Since coated woven fabrics have a smaller number of frayed thread compared with those of uncoated fabrics, the knife cutting is used for coated woven fabrics. However, if the coating amount of the coated fabric decreases, frayed threads increase when the coated fabric is cut with a knife or sewn, and it is necessary to increase the size of a cut part to make a margin rate larger. Therefore, coated fabrics hardly causing thread fraying even with a small amount of coating are demanded.

Although resin such as a synthetic rubber that is a coated material of the coated woven fabrics has been hitherto used as a coating agent after making into a solution using an organic solvent, there is a problem that the organic solvent is vaporized so that the environment of particularly the working place is polluted, and therefore a non-solvent-based silicone has been used mainly at present. However, there is a limit to the reduction in a coating amount because a solid content ratio in a coating agent made of a non-solvent-based silicone is 100%, and it has been technically difficult to reduce the coating amount to 10 $g/m^2$ or less.

Patent Document 1 discloses a technology in which when a solid powder dispersed in water under the presence of a surfactant is used in a silicone aqueous emulsion, the added amount of the solid powder is made within a range from 0.1 parts by mass to less than 5 parts by mass. Although the coating amount of 10 $g/m^2$ or less is achieved and a rate of 60 m/min or lower is also achieved in a flammability test (JIS D 1201; Horizontal Method), it is not sufficient as a rate of flammability required for airbags for vehicles. Furthermore, there is no description therein for air permeability and thread fraying when the fabric is cut with a knife or sewn.

Patent Documents 2 and 3 disclose a technology in which a reduced coating amount is realized by a method of impregnating with a water-dispersible resin. Although the coating amount of 10 $g/m^2$ or less is achieved, and both of flammability and initial air permeability satisfy the performance required for airbags for vehicles, there is no description for thread fraying when the fabric is cut with a knife or sewn. Therefore, it is a fact that the extensive study has not been made for an optimum base fabric satisfying initial air permeability and flammability even with a small coating amount of 10 $g/m^2$ or less and also from the viewpoint of thread fraying when the fabric is cut with a knife or sewn.

RELATED-ART DOCUMENTS

Patent Documents

Patent Document 1: JP-A-2001-287609
Patent Document 2: JP-A-2002-327350
Patent Document 3: JP-A-2003-183983

SUMMARY OF THE INVENTION

Problems to be Solved by the Invention

The present invention has been made in view of circumstances of the problems of conventional techniques described above. An object of the present invention is to provide a coated fabric used for an airbag for vehicles, and more particularly, a base fabric for an airbag that, even with a small amount of coating, has a low initial air permeability, an excellent flammability, and a small amount of thread fraying when the fabric is cut with a knife or sewn.

Means for Solving the Problems

As a result of a keen examination to solve the above problem, present invention is achieved. That is, the present invention consists of the following constitutions.

1. A base fabric for an airbag comprising a coated fabric wherein one or more resin compositions selected from the group consisting of a polyurethane-based thermoplastic composition, an acrylic-based thermoplastic composition, a polyester-based thermoplastic composition, and a polyamide-based thermoplastic resin composition are applied to at least one side of a textile, the textile comprising a synthetic fiber textile constituted of threads of 200 to 500 dtex and having a cover factor of 1800 to 2500, wherein a coating amount of the resin composition applied to the one side of the the textile is 0.1 to 10 $g/m^2$ in terms of a mass after drying, an air permeability under a differential pressure of 100 kPa is 0.05 $L/cm^2/min$ or less, a flammability measured in accordance with FMVSS302 is self-extinguishing, and the number of frayed thread at the end part after 100 repetitions of a scrub test in accordance with ISO5981 is 5 or less.

2. The base fabric for an airbag according to 1, wherein the resin composition comprises a polyamide-based thermoplastic resin composition.

3. The base fabric for an airbag according to 2, wherein the polyamide-based thermoplastic resin composition has a resin film strength of not less than 10 MPa and not more than 17 MPa, and a break elongation of not less than 900% and not more than 1300% in a film product made of the polyamide-based thermoplastic resin composition.

4. The base fabric for an airbag according to 2 or 3, wherein the polyamide-based thermoplastic resin composition comprises a polyamide elastomer resin (A), an antioxidant (B), a reactive compound (C) and a crosslinking agent (D).

5. The base fabric for an airbag according to 4, wherein the polyamide-based thermoplastic resin composition further comprises an adhesion aid (E) and an adhesion aid reaction catalyst (F).

6. The base fabric for an airbag according to 5, wherein the polyamide-based thermoplastic resin composition further comprises a pigment (G).

7. The base fabric for an airbag according to 5 or 6 made by applying the polyamide-based thermoplastic resin composition wherein a mixing amount as a solid content of each of the reactive compound (C), the crosslinking agent (D) and the adhesion aid (E) relative to 100 parts by mass of the polyamide elastomer resin (A) is as follows:

the reactive compound (C): 1 to 5 parts by mass,
the crosslinking agent (D): 2 to 4 parts by mass, and
the adhesion aid (E): 5 to 10 parts by mass.

Advantageous Effects of the Invention

The base fabric for an airbag of the present invention, which can solve the conventional problems described above, has a low initial air permeability, an excellent flammability, and a small amount of thread fraying when the fabric is cut with a knife or sewn even with a small amount of coating.

MODE FOR CARRYING OUT THE INVENTION

This invention is described in detail below.

The synthetic fiber textile in the present invention means a textile that is woven using synthetic fiber thread. The textile is excellent in mechanical strength and has an advantage in that the thickness can be reduced. Examples of the structure of the textile include, but are not limited, plain weave, twill weave, satin weave and variant weave thereof, multiaxial weave, and the like. Among them, plain weave, which is excellent in mechanical strength, is particularly preferred.

Materials used for the synthetic fiber are not particularly limited, but aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate are particularly used.

Besides the above, all-aromatic polyester fiber, poly-p-phenylenebenzobisoxazole fiber (PBO fiber), ultrahigh molecular polyethylene fiber, polyphenylene sulfide fiber, polyether ketone fiber, or the like can be used. However, when the economic efficiency is taken into consideration, polyester fiber and polyamide fiber are preferred. In those fibers, a part of or all of them may be produced from recycled raw materials.

In these synthetic fibers, various kinds of additives may be contained for a purpose of enhancing the step passing property in the manufacturing step for starting yarn or the after-processing step. Examples of the additives include an antioxidant, thermostabilizer, smoothening agent, antistatic agent, thickener, and flame retardant. Further, the synthetic fiber may be a dope-dyed yarn or a yarn that is dyed after filature. Furthermore, the cross section of a single yarn may be any deformed cross section in addition to an ordinary round cross section.

The fineness of thread constituting the textile is preferred to be 200 to 500 dtex. When the fineness is more than 500 dtex, the thickness of the base fabric increases, and the package ability of airbag deteriorates. On the other hand, when the fineness is less than 200 dtex, mechanical characteristics on the operation of airbag such as tensile strength and tear mechanical characteristic of the coated fabric cannot be satisfied.

As to the synthetic fiber, it is preferred to use multifilament yarn of 72 filaments or more or multifilament yarn of 108 filaments or more in the case of a base fabric having an especially small coating amount in order to achieve the low air permeability. Although the upper limit of the number of filaments is not particularly limited, 216 filaments or less is preferred since the production of yarn becomes difficult when the number of filaments is too large. The fineness per single filament of the obtained yarn is preferably within the range of 0.1 to 10 dpf.

As to the textile, it is necessary that a cover factor represented by the formula 1 be 1800 to 2500. It is not preferred that the cover factor be less than 1800 since the air permeability increases and the stitch deviation of a sewn portion of an airbag becomes large. More preferably, the cover factor is 1900 to 2400.

Cover factor=(warp fineness (dtex)×0.9)$^{1/2}$×warp density(thread/2.54 cm)+(weft fineness (dtex)× 0.9)$^{1/2}$×weft density(thread/2.54 cm)　　(Formula 1)

The base fabric in the present invention is manufactured by such a manner that a resin composition is applied to a fabric prepared by a known method. As to the resin composition, a water-dispersed resin composition is preferable since a coating amount can be reduced. The water-dispersed resin mentioned here may be not only a resin that is soluble in water but also a resin that is dispersed in a state of colloid or emulsion and there is no particular limitation therefor.

As to the water-dispersed resin composition to be used, thermoplastic resin represented by polyurethane-based resin, acrylic-based resin, polyester-based resin, and polyamide-based resin is preferable, and a thermoplastic elastomer resin composition is more preferable. In the present invention, a polyamide-based thermoplastic elastomer resin composition can be particularly used as a preferable resin composition. Although thermoset resins, which are widely used as an existing coating agent for airbags, may be used, there are problems that a cost rises because a sufficient heat quantity is required for curing and that when the coating amount of resin is reduced, a burning speed is increased. In order to suppress the burning speed or show self-extinguishing property in spite of a small coating amount of the resin, thermoplastic resin is necessary. Incidentally, the thermoplastic resin mentioned in the present invention means a resin where an endothermic peak upon melting is observed in a DSC measurement. Although there is no particular limitation for a coating method, and known methods may be used, it is preferred to use a knife coating method when the cost and the flexibility of textile after coating are taken into consideration.

In the present invention, it is better to set a solid concentration of the resin composition when dispersed in water to 15 to 35 mass %. If the solid concentration is less than 15 mass %, the coating amount of 10 g/m$^2$ or less can be achieved, but the resin is unnecessarily impregnated, and as a result, the air permeability cannot be satisfied. If the solid concentration is set to be more than 35 mass %, the impregnation amount of the resin is small and the air permeability is satisfied, but it is difficult to achieve the coating amount of 10 g/m$^2$ or less, and in addition, thread fraying tends to occur. More preferably, the solid concentration of the resin composition is 20 to 30%.

In the present invention, the mass after drying of the resin composition is preferably 0.1 to 10 g/m$^2$. The mass after drying is determined by subtracting the value of the mass before coating as measured in accordance with JIS L 1096 8.4.2 from the value of the mass after coating as measured in accordance with JIS L 1096 8.4.2. It is not preferred that the mass after drying be less than 0.1 g/m² since the air permeability cannot be achieved, and it is not preferred that the mass after drying be more than 10 g/m² since the texture tends to become hard. More preferably, the mass after drying is 1.0 to 8.0 g/m² and still more preferably 1.0 to 6.0 g/m².

In the present invention, an air permeability under a differential pressure of 100 kPa is used for evaluating the air permeability of the coated fabric. This is because, in the usual airbag deployment, a force of 30 to 50 kPa is applied, but further in view of the influence of heat by the explosive of an inflator, it is suitable to evaluate an air permeability under a differential pressure of 100 kPa.

The air permeability of the coated fabric under a differential pressure of 100 kPa is preferably 0.01 to 0.05 L/cm²/min. The air permeability is more preferably 0.04 L/cm²/min or less, and most preferably 0.03 L/cm²/min or less. It is not preferred that the air permeability be more than 0.05 L/cm²/min since initial restraint performance deteriorates in the case of use for side and curtain airbags for which internal pressure retention performance is particularly required. When the air permeability is less than 0.01 L/cm²/min, the initial restraint performance is sufficient, but the air permeability is not significantly different from that within the range of the present invention. Furthermore, this is not preferred since the coating weight increase due to the decrease of air permeability, resulting in the disadvantage in cost and flexibility.

Usually, a coated base fabric where an attached amount of resin is reduced has a thin film thickness of the resin, and has a problem that the coated resin film is easy to break under a differential pressure of 100 kPa and the air permeability is increased. However, the inventors of the present invention have found a novel technological idea, which can solve the problems that cannot have been solved by related arts, that low air permeability property and flammability are improved, and the generation of thread fraying at a cutting surface can be significantly suppressed, even when a coating amount is a small amount of 10 g/cm² or less, by using a resin composition having a resin film strength of not less than 10 MPa and not more than 17 MPa and a resin film elongation of not less than 900% and not more than 1300% when the resin composition is formed in a film state.

When the film strength of the resin composition is less than 10 MPa, the film may not withstand a shock of heat gas generated from an inflator and break, resulting in a high air permeability. On the other hand, when the film strength is more than 17 MPa, the resin becomes brittle, and not only the adhesive property reduces and thread fraying is not improved but also it becomes difficult to keep the film elongation of the resin film to be 900%. Furthermore, when the elongation of the resin composition is less than 900%, the resin cannot follow up in response to the movement of threads occurring at pressure loading, and the film may break. On the other hand, when the elongation of the resin film is 1300% or more, it becomes difficult to stably maintain the film strength of 10 MPa or more. More preferably, a resin film made of the resin composition has a film strength of 10 to 16 MPa and a film elongation of 900 to 1200%, and further preferably, a resin film made of the resin composition has a film strength of 11 to 16 MPa and a film elongation of 1000% to 1200%.

A sample for measurement of film strength and elongation of a resin is obtained by pouring the resin into a mold fixing frame having 0.3 mm thickness, allowing to stand at room temperature for 24 hours, and subsequently being subjected to a heat treatment at 50° C. for 4 hours. Then, the sample is punched out into a JIS No. 7 dumbbell shape to be measured.

The coated base fabric of the present invention may be a both-side-coated base fabric where coating is done on both sides of the textile but, in view of package ability, a single-side-coated base fabric where coating is done merely on one side is more preferred.

For the base fabric for an airbag of the present invention, it is important that the number of frayed thread at the end part after 100 repetitions of a scrub test in accordance with ISO5981 be 5 or less. In the production of the base fabric for an airbag, usually several or several tens of fabrics are piled up and cut, and then sewn. If thread fraying of the base fabric occurs in the steps of cutting and sewing, the margin rate from the sewing position to the edge of the airbag reduces, and hence there is a problem that the fabric is required to be cut in a larger part than usual. However, it has been found that in the base fabric where the number of frayed thread at the end part after 100 repetitions of a scrub test in accordance with ISO5981 is 5 or less, thread fraying is not generated in the steps of cutting and sewing. More preferably, the number of frayed thread at the end part after 100 repetitions of a scrub test in accordance with ISO5981 is 3 or less.

The resin composition of the present invention includes a polyamide elastomer resin (A), an antioxidant (B), a reactive compound (C) and a crosslinking agent (D), and preferably further includes an adhesion aid (E) and an adhesion aid reaction catalyst (F). In addition, the resin composition of the present invention may further include a pigment (G).

It is desired that the polyamide elastomer resin of a component (A) be a copolymerized polyether amide that is composed of a soft segment and a hard segment and has a weight-average molecular weight Mw of 60,000 to 230,000. When the weight-average molecular weight Mw is less than 60,000, the weight-average molecular weight Mw of the resin (A) after heat treatment decreases, and the air permeability of the coated fabric after heat treatment increases. On the other hand, when the weight-average molecular weight Mw of the resin (A) exceeds 230,000, the viscosity of the resin composition increases. Therefore, the coating amount is likely to become larger than a designed value, and in addition, the viscosity significantly decreases due to shear generated at knife coating. As a result, due to tension variation or tension difference in the width direction of the base fabric at coating, coating speckle is produced and the air permeability becomes high in a portion where the coating amount is small.

It is preferred that the soft segment in the component (A) be a polyether polyamide composed of a polyether diamine compound and a dicarboxylic acid compound. Examples of the polyether diamine compound include polyoxyethylene, 1,2-polyoxypropylene, 1,3-polyoxypropylene and an amino-modified copolymer thereof. Furthermore, as specific examples of the polyether diamine compound, JEFFAMINE ED900 manufactured by HUNTSMAN, USA, or the like can be used. As the dicarboxylic acid compound, at least one kind dicarboxylic acid selected from aliphatic, alicyclic and aromatic dicarboxylic acids, or a derivatives thereof can be used. Examples of the dicarboxylic acid compound include aliphatic dicarboxylic acids such as linear aliphatic dicarboxylic acids having 2 to 25 carbon atoms such as oxalic acid, succinic acid, glutaric acid, adipic acid, pimelic acid, suberic acid, azelaic acid, sebacic acid and dodecanedioic acid, dimerized aliphatic dicarboxylic acids (dimer acid) having 14 to 48 carbon atoms obtained by dimerzing unsaturated fatty acid obtained by fractional distillation of triglyceride, and hydrogen additives (hydrogenated dimer acid) thereof; alicyclic dicarboxylic acids such as 1,4-cyclohexanedicarboxylic acid; and aromatic dicarboxylic acids such as terephthalic acid and isophtalic acid. As the dimer acid and hydrogenated dimer acid, products manufactured by Uniqema under the trade names "PRIPOL 1004", "PRIPOL 1006", "PRIPOL 1009", and "PRIPOL 1013" and the like can be used.

It is preferred that the hard segment in the component (A) be made of a polyamide composed of an aminocarboxylic acid compound and/or a lactam compound. As the aminocarboxylic acid compound and the lactam compound, at least one polyamide-forming monomer including aliphatic, alicyclic and/or aromatic monomers, selected from ω-aminocarboxylic acid, lactam, those synthesized from diamine and dicarboxylic acid, and salts thereof are used. Examples of the ω-aminocarboxylic acid include aliphatic ω-aminocarboxylic acids having 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Examples of the lactam include aliphatic lactams having 5 to 20 carbon atoms, such as ε-caprolactam, ω-enantholactam, ω-undecalactam, ω-dodecalactam, and 2-pyrrolidone. In those synthesized form diamine and dicarboxylic acid, and salts thereof, examples of the diamine include diamine compounds such as aliphatic diamines having 2 to 20 carbon atoms such as ethylenediamine, trimethylene diamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, and 3-methylpentamethylenediamine.

The antioxidant of a component (B) is contained in the resin composition for preventing heat deterioration of the polyamide elastomer resin (A) and reducing a change in air permeability after heat treatment. The component (B) may be any of an aromatic amine-based antioxidant, a hindered phenol-based antioxidant, a sulfur-based antioxidant, and a phosphorus-based antioxidant, and the hindered phenol-based antioxidant is preferable.

The total mixing amount of these antioxidants is 0.1 to 5 parts by mass, preferably 0.5 to 3 parts by mass, further preferably 1 to 2 parts by mass, relative to 100 parts by mass of the polyamide elastomer resin.

The reactive compound of a component (C) is a component that allows the suppression of the movement of pigment during drying, as well as the decrease in color unevenness due to water droplets occurring after drying. Although the reactive compound of the component (C) is not particularly limited as long as it reacts with a functional group having polarity, taking the reaction with a hydroxyl group widely used in a nonionic surfactant into consideration, it preferably has an isocyanate group as a functional group from the viewpoint of low-temperature reactivity or cost. It is preferred that the mixing amount of the reactive compound having an isocyanate group be 1 to 5 parts by mass as a solid content relative to 100 parts by mass of a water-dispersed resin composition (water-based resin dispersion liquid) containing the polyamide elastomer resin of the component (A). It is not preferred that the mixing amount be less than 1 part by mass since the effect of the suppression of the movement of pigment during drying decreases. Furthermore, if the mixing amount of the reactive compound exceeds 5 parts by mass, a mixed liquid made of the resin composition tends to foam, and therefore in the case of a coated fabric with a small coating amount, pores are formed during drying after coating and the air permeability deteriorates. More preferably, the mixing amount is 1 to 3 parts by mass.

The crosslinking agent of a component (D) is a component required for adjusting the film strength and the elongation of a film product by being crosslinked with the polyamide elastomer resin of the component (A). Although the crosslinking agent is not particularly limited as long as it reacts with the acid terminal of the polyamide elastomer resin of the component (A), carbodiimide is preferred from the viewpoint of low-temperature reactivity. It is preferred that the mixing amount of carbodiimide be 2 to 4 parts by mass as a solid content relative to 100 parts by mass of a water-dispersed resin composition (water-based resin dispersion liquid) containing the polyamide elastomer resin of the component (A). If the mixing amount is less than 2 parts by mass, a desired film strength and elongation of the film product cannot be achieved. Furthermore, if the mixing amount exceeds 4 parts by mass, only a partial reaction of an excess crosslinking agent with the polyamide elastomer resin of the component (A) proceeds, resulting in lowering in film strength and elongation of the film product. More preferably, the mixing amount is 2.4 to 3.6 parts by mass.

The adhesion aid of a component (E) is a component for bonding a resin where the polyamide elastomer resin of the component (A) is cross-linked with the crosslinking agent of the component (D) to the synthetic fiber textile, and is a necessary component for improving thread fraying even with a small coating amount. A typical adhesion aid is an epoxy compound. It is preferred that the mixing amount of an epoxy-based adhesion aid be 5 to 10 parts by mass as a solid content relative to 100 parts by mass of a water-dispersed resin composition (water-based resin dispersion liquid) containing the polyamide elastomer resin of the component (A). If the mixing amount is less than 5 parts by mass, the adhesion between the elastomer resin and the synthetic fiber textile is insufficient, thereby increasing thread fraying. If the mixing amount is more than 10 parts by mass, a reaction with the reactive groups of the polyamide elastomer resin excessively proceeds although the adhesion increase, and the film strength and the elongation of a film product becomes low, resulting in increasing in initial air permeability. More preferably, the mixing amount is 5 to 8 parts by mass.

The adhesion aid reaction catalyst of a component (F) serves to promote a reaction of the polyamide elastomer resin of the component (A) with the adhesion aid of the component (E). When the adhesion aid reaction catalyst is not contained, a heat treatment is required to be conducted at a high temperature. However, when given a heat quantity of 200° C.×1 min or more as a base fabric temperature when coating, the resin composition is unnecessarily impregnated and a problem that the air permeability deteriorates may occur. The catalyst is not particularly limited as long as it promotes the reaction, imidazole-based or amine-based catalyst is preferred from the viewpoint of the reaction rate. It is preferred that the mixing amount of the adhesion aid reaction catalyst be 3 to 7 wt % of the mass of the adhesion aid of the component (E) added. If the mixing amount is less than 3 wt %, a sufficient reaction cannot be obtained. If the mixing amount is more than 7 wt %, the adhesion aid reaction catalyst reaches a performance limit, and the reactivity is unchanged even if the adhesion aid reaction catalyst is further added. More preferably, the mixing amount is 4 to 6 wt %.

The pigment of a component (G) is used for the purpose of coloring of the base fabric for airbags and suppressing thermal deterioration of the polyamide elastomer resin (A). The pigment (D) may be either an inorganic pigment or an organic pigment, and an organic pigment is preferred from the viewpoint of the dispersion. As the organic pigment, condensed azo-based, isoindolinone-based, phthalocyanine-based, threne-based, benzimidazolone-based, quinacridone-based, halogenated copper phthalocyanine-based, copper phthalocyanine (ß)-based organic pigment, or the like can be used, for example. The content of the pigment may be adjusted so as to obtain a desired color, but the mixing amount of the pigment (D) is preferably 0.1 to 5 parts by mass relative to 100 parts by mass of a water-dispersed resin composition (water-based resin dispersion liquid) containing the polyamide elastomer resin (A), more preferably 0.5 to 4 parts by mass, particularly preferably 1 to 3 parts by mass.

EXAMPLES

Below, by way of examples, the present invention will be more specifically described. However, the present invention is not limited by the following examples. Further all kinds' evaluation in the examples was performed with the following methods.

Total fineness: Total fineness was measured according to the method mentioned in JIS L-1095 9.4.1.

Filament numbers: Filament numbers were counted from the cross-sectional picture of a filament thread.

Density of textile: The density of the textile was measured according to the method mentioned in JIS L-1096 8.6.1.

Coating weight: The weight of the coated fabric was measured according to the method mentioned in JIS L-1096 8.4.2. Next, as a blank sample, the processing treatment was carried out without coating with the resin under the same condition at the coating, and then the weight of the resulting blank sample was measured according to the method mentioned in JIS L-1096 8.4.2. After that, the difference between the weight of the coated fabric and the weight of the blank sample was determined as the coating amount. Incidentally, the value was expressed in weight per 1 m$^2$ (g/m$^2$).

Resin film strength and elongation: A film having a uniform thickness of 0.3 mm was formed. A tensile test was conducted at a chuck distance of 20 mm and at a speed of 27 mm/min to measure the strength and elongation at break of the film. Note that five points in the same sample were randomly measured to obtain the average value. The tensile test was conducted under the environmental conditions of 23±3° C., 65±10%.

Air permeability: Air permeability under a pressure of 100 kPa was measured using a high pressure air permeability tester (manufactured by OEM System). Note that five points in the same sample were randomly measured to obtain the average value.

Flammability: Measurement was conducted in accordance with a method mentioned in FMVSS302 Horizontal Method, the maximum value of a burning speed (mm/min) was determined as flammable. Note that five points in the same sample were randomly measured. The case where the burning speed did not reach a reference mark was judged as self-extinguishing.

Thread fraying after scrub test: 100 repetitions of a scrub test were conducted with the coated surfaces being made to join each other using a scrub tester IMC-15D7-A type (manufactured by Imoto Machinery Co., Ltd.) in accordance with ISO5981. The load was adjusted to 10 kg, and the distance d between a mount and the lower surface of a sample sandwich portion was adjusted to 6 mm±0.1 mm. Then, the sample was removed from the tester and checked for how many threads frayed at the end part. Note that five points in the same sample were randomly measured to check the largest number of frayed thread.

Example 1

Polyamide 66 multi-filament yarn including 144 filaments where the total fineness was 470 dtex was woven by plain weave in a water jet room, and then the resulting product was subjected to a shrinkage processing using boiling water and a dry finishing at 110° C. to obtain a textile where the warp density was 51 threads/2.54 cm, the weft density was 51 threads/2.54 cm, and the cover factor was 2211. Next, 1005.45 g of polyether diamine (JEFFAMINE ED900 manufactured by HUNTSMAN; total amine: 2.16 meq/g), 158.68 g of adipic acid (AA), 375.00 g of ε-caprolactam (ε-CL), and 22.5 mL of an aqueous solution of phosphoric acid (63.2 g/L) were added to a container, and the inner area of the container was well substituted with nitrogen, temperature was raised up to 230° C. during 0.5 hours, and polymerization was conducted at 230° C. for 4.0 hours. After that, polymerization was continued for 1.5 hours under a reduced pressure to obtain a polymer. Then, the inner area of the container was depressurized using a pressure adjusting device for 1.0 hour while the temperature was still maintained at 230° C., and then polymerization was further conducted at 230° C. for 0.5 hours to obtain a polyamide elastomer resin (A). To this polyamide elastomer resin (A), the antioxidant (B) (IRGANOXO010 manufactured by CIBA Japan) was added in an amount such that a polymer ratio be 0.8 mass % to prepare a water-based resin dispersion liquid (pH 7.2) having a solid concentration of 20%. Then, to 100 g of the water-based resin dispersion liquid, 1.7 g as a solid content of Aquanate AQ-210 (polyisocyanate) manufactured by Nippon Polyurethane Industry Co., Ltd. as the reactive compound of the component (C), 3.3 g as a solid content of Carbo-dilite V02-L2 (carbodiimide) manufactured by Nisshinbo Chemical Inc. as the crosslinking agent (D), 5.5 g as a solid content of DENACOL EX-810 (epoxy compound) manufactured by Nagase ChemteX Corporation as the adhesion aid (E), 5% by weight, relative to the mixed amount of the adhesion aid (E), of 2-methylimidazole (2MZ-H) manufactured by Shikoku Chemicals Corporation as the adhesion aid reaction catalyst (F), and 0.4 g of a phthalocyanine green pigment (DY-4 manufactured by Mikuni Color Ltd.: a solid concentration of 25 mass %) as the component (G) were mixed and stirred. A film product made of the resin at that time had a film strength of 14.4 MPa and a break elongation of 1083%. The water-based dispersion liquid of this resin mixture was applied to one side of the above textile by a knife coating, and the coating weight after drying was made 5.8 g/m$^2$. The characteristic properties of this coated fabric were evaluated and the results are shown in Table 1. The obtained base fabric was extremely excellent in air permeability, flammability and thread fraying.

Example 2

A coated fabric was obtained by using the same resin mixture and in the same manner as in Example 1 except that 3.3 g as a solid content of the reactive compound of the component (C), 2.7 g as a solid content of the crosslinking agent of the component (D), and 8.3 g as a solid content of the adhesion aid of the component (E) were mixed. A film product made of the resin at that time had a film strength of 12.7 MPa and a break elongation of 1070%. The coating weight after drying was 5.5 g/m². The characteristic properties of the obtained base fabric were evaluated and shown in Table 1. The obtained base fabric was extremely excellent in air permeability, flammability and thread fraying.

Example 3

Polyamide 66 multi-filament yarn including 144 filaments where the total fineness was 470 dtex was woven by plain weave in a water jet room, and then the resulting product was subjected to a shrinkage processing using boiling water and a dry finishing at 110° C. to obtain a textile where the warp density was 53 threads/2.54 cm, the weft density was 53 threads/2.54 cm, and the cover factor was 2298. Using this textile, a coated fabric was obtained by using the same resin mixture and in the same manner as in Example 1 except that 1.1 g as a solid content of Aquanate AQ-130 (polyisocyanate) manufactured by Nippon Polyurethane Corporation as the reactive compound of the component (C), 3.9 g as a solid content of the crosslinking agent of the component (D), and 6.9 g as a solid content of the adhesion aid of the component (E) were mixed. A film product made of the resin at that time had a film strength of 15.2 MPa and a break elongation of 1083%. The coating weight after drying was 7.1 g/m². The characteristic properties of the obtained base fabric were evaluated and shown in Table 1. The obtained base fabric was extremely excellent in air permeability, flammability and thread fraying.

Example 4

Polyamide 66 multi-filament yarn including 144 filaments where the total fineness was 470 dtex was woven by plain weave in a water jet room, and then the resulting product was subjected to a shrinkage processing using boiling water and a dry finishing at 110° C. to obtain a textile where the warp density was 49 threads/2.54 cm, the weft density was 49 threads/2.54 cm, and the cover factor was 2125. Using this textile, a coated fabric was obtained by using the same resin mixture and in the same manner as in Example 1 except that a water-based resin dispersion liquid having a solid concentration of 25% was prepared using the polyamide elastomer (A) (Mw:90,000) and the antioxidant (B) of Example 1, and furthermore 4.4 g as a solid content of the reactive compound of the component (C), 2.2 g as a solid content of the crosslinking agent of the component (D), and 9.6 g as a solid content of DENACOL EX-850 (epoxy compound) manufactured by Nagase ChemteX Corporation as the adhesion aid of the component (E) were mixed. A film product made of the resin at that time had a film strength of 11.1 MPa and a break elongation of 943%. The coating weight after drying was 7.5 g/m². The characteristic properties of the obtained base fabric were evaluated and shown in Table 1. The obtained base fabric was extremely excellent in air permeability, flammability and thread fraying.

Example 5

Polyamide 66 multi-filament yarn including 108 filaments where the total fineness was 350 dtex was woven by plain weave in a water jet room, and then the resulting product was subjected to a shrinkage processing using boiling water and a dry finishing at 110° C. to obtain a textile where the warp density was 59 threads/2.54 cm, the weft density was 59 threads/2.54 cm, and the cover factor was 2208. Using this textile, a coated fabric was obtained by using the same resin mixture and in the same manner as in Example 1. Here, the coating weight after drying was 5.5 g/m². The characteristic properties of the obtained base fabric were evaluated and shown in Table 1. The obtained base fabric was extremely excellent in air permeability, flammability and thread fraying.

Comparative Example 1

A coated fabric was obtained by using the same resin mixture and in the same manner as in Example 1 except that the adhesion aid of the component (E) and the adhesion aid reaction catalyst of the component (F) were not mixed. A film product made of the resin at that time had a film strength of 14.9 MPa and a break elongation of 1101%. Here, the coating weight after drying was 6.0 g/m². The characteristic properties of the obtained base fabric were evaluated and shown in Table 1. The obtained base fabric was excellent in air permeability and flammability, but had a large amount of thread fraying.

Comparative Example 2

A coated fabric was obtained by using the same resin mixture and in the same manner as in Example 1 except that 2.7 g as a solid content of the crosslinking agent of the component (D) and 2.8 g as a solid content of the adhesion aid of the component (E) were mixed. A film product made of the resin at that time had a film strength of 13.8 MPa and a break elongation of 1050%. The coating weight after drying was 6.8 g/m². The characteristic properties of the obtained base fabric were evaluated and shown in Table 1. The obtained base fabric was excellent in air permeability and flammability, but had a large amount of thread fraying.

Comparative Example 3

A coated fabric was obtained by using the same resin mixture and in the same manner as in Example 1 except that 6.7 g as a solid content of the reactive compound of the component (C) and 2.7 g as a solid content of the crosslinking agent of the component (D) were mixed. A film product made of the resin at that time had a film strength of 9.5 MPa and a break elongation of 855%. The coating weight after drying was 6.7 g/m². The characteristic properties of the obtained base fabric were evaluated and shown in Table 1. The obtained base fabric was excellent in flammability and thread fraying, but had a high air permeability.

Comparative Example 4

A coated fabric was obtained by using the same resin mixture and in the same manner as in Example 1 except that 1.7 g as a solid content of the crosslinking agent of the component (D) and 6.9 g as a solid content of the adhesion aid of the component (E) were mixed. A film product made of the resin at that time had a film strength of 8.9 MPa and a break elongation of 785%. The coating weight after drying was 5.7 g/m². The characteristic properties of the obtained base fabric were evaluated and shown in Table 1. The obtained base fabric was excellent in flammability and thread fraying, but had a high air permeability.

Comparative Example 5

A coated fabric was obtained by using the same resin mixture and in the same manner as in Example 1 except that a water-based resin dispersion liquid having a solid concentration of 40% was prepared using the polyamide elastomer (A) (Mw:90,000) and the antioxidant (B) of Example 1, and 4.9 g as a solid content of the reactive compound of the component (C), 2.1 g as a solid content of the crosslinking agent of the component (D), and 9.6 g as a solid content of the adhesion aid of the component (E) were mixed. A film product made of the resin at that time had a film strength of 7.4 MPa and a break elongation of 932%. The coating weight after drying was 11.0 g/m². The characteristic properties of the obtained base fabric were evaluated and shown in Table 1. The obtained base fabric was extremely excellent in air permeability, flammability and thread fraying, but the texture was hard due to the large coated amount.

INDUSTRIAL APPLICABILITY

The base fabric for an airbag of the present invention has a low initial air permeability, an excellent flammability, and in addition a small amount of thread fraying when the fabric is cut with a knife, even with a small amount of coating, and therefore can be utilized for an airbag which is one of automobile safety devices, whereby considerably contributes to the industrial field.

The invention claimed is:

1. A base fabric for an airbag comprising a coated fabric wherein a polyamide-based thermoplastic resin composition is applied to at least one side of a textile, the textile comprising a synthetic fiber textile constituted of threads of 200 to 500 dtex and having a cover factor of 1800 to 2500,
    wherein a coating amount of the resin composition applied to the one side of the textile is 0.1 to 10 g/m² in terms of a mass after drying, an air permeability under a differential pressure of 100 kPa is 0.05 L/cm²/min or less, a flammability measured in accordance

TABLE 1

|  |  | Example 1 | Example 2 | Example 3 | Example 4 | Example 5 |
|---|---|---|---|---|---|---|
| Total fineness | dtex | 470 | 470 | 470 | 470 | 350 |
| Filament numbers | thread | 144 | 144 | 144 | 144 | 108 |
| Textile density(warp/weft) | thread/2.54 cm | 51/51 | 51/51 | 53/53 | 49/49 | 59/59 |
| Cover factor | — | 2,211 | 2,211 | 2,298 | 2,125 | 2,208 |
| Resin water-dispersion liquid concentration | % | 20 | 20 | 20 | 25 | 20 |
| (C)Reactive compound (polyisocyanate) | — | AQ-210 | AQ-210 | AQ-130 | AQ-210 | AQ-210 |
|  | parts by mass | 1.7 | 3.3 | 1.1 | 4.4 | 1.7 |
| (D)Crosslinking agent (carbodiimide) | — | V02-L2 | V02-L2 | V02-L2 | V02-L2 | V02-L2 |
|  | parts by mass | 3.3 | 2.7 | 3.9 | 2.2 | 3.3 |
| (E)Adhesion aid (epoxy compound) | — | EX-810 | EX-810 | EX-810 | EX-850 | EX-810 |
|  | parts by mass | 5.5 | 8.3 | 6.9 | 9.6 | 5.5 |
| (F)Adhesion aid reaction catalyst (2-methylimidazole) | — | 2MZ-H | 2MZ-H | 2MZ-H | 2MZ-H | 2MZ-H |
|  | parts by mass | 0.28 | 0.42 | 0.35 | 0.48 | 0.28 |
| (G) Pigment (phthalocyanine green) | — | DY-4 | DY-4 | DY-4 | DY-4 | DY-4 |
|  | parts by mass | 0.4 | 0.4 | 0.4 | 0.4 | 0.4 |
| Coating weight | g/m² | 5.8 | 5.5 | 7.1 | 7.5 | 5.5 |
| Resin film strength | MPa | 14.4 | 12.7 | 15.2 | 11.1 | 14.4 |
| Resin film elongation | % | 1083 | 1070 | 1083 | 943 | 1083 |
| Air permeability (@100 kPa) | L/cm²/min | 0.016 | 0.027 | 0.017 | 0.046 | 0.035 |
| Flammability | judgment | self-extinguishing | self-extinguishing | self-extinguishing | self-extinguishing | self-extinguishing |
| Thread fraying after scrub test | thread | 3 | 2 | 3 | 1 | 3 |
|  |  | Comparative Example 1 | Comparative Example 2 | Comparative Example 3 | Comparative Example 4 | Comparative Example 5 |
| Total fineness | dtex | 470 | 470 | 470 | 470 | 470 |
| Filament numbers | thread | 144 | 144 | 144 | 144 | 144 |
| Textile density(warp/weft) | thread/2.54 cm | 51/51 | 51/51 | 51/51 | 51/51 | 51/51 |
| Cover factor | — | 2,211 | 2,211 | 2,211 | 2,211 | 2,211 |
| Resin water-dispersion liquid concentration | % | 20 | 20 | 20 | 20 | 40 |
| (C)Reactive compound (polyisocyanate) | — | AQ-210 | AQ-210 | AQ-210 | AQ-210 | AQ-210 |
|  | parts by mass | 1.7 | 1.7 | 6.7 | 1.7 | 4.9 |
| (D)Crosslinking agent (carbodiimide) | — | V02-L2 | V02-L2 | V02-L2 | V02-L2 | V02-L2 |
|  | parts by mass | 3.3 | 2.7 | 2.7 | 1.7 | 2.1 |
| (E)Adhesion aid (epoxy compound) | — | — | EX-810 | EX-810 | EX-810 | EX-810 |
|  | parts by mass | — | 2.8 | 5.5 | 6.9 | 9.6 |
| (F)Adhesion aid reaction catalyst (2-methylimidazole) | — | — | 2MZ-H | 2MZ-H | 2MZ-H | 2MZ-H |
|  | parts by mass | — | 0.14 | 0.28 | 0.35 | 0.48 |
| (G) Pigment (phthalocyanine green) | — | DY-4 | DY-4 | DY-4 | DY-4 | DY-4 |
|  | parts by mass | 0.4 | 0.4 | 0.4 | 0.4 | 0.4 |
| Coating weight | g/m² | 6.0 | 6.8 | 6.7 | 5.7 | 11.0 |
| Resin film strength | MPa | 14.9 | 13.8 | 9.5 | 8.9 | 7.4 |
| Resin film elongation | % | 1101 | 1050 | 855 | 785 | 932 |
| Air permeability (@100 kPa) | L/cm²/min | 0.021 | 0.049 | 0.102 | 0.123 | 0.043 |
| Flammability | judgment | self-extinguishing | self-extinguishing | self-extinguishing | self-extinguishing | self-extinguishing |
| Thread fraying after scrub test | thread | 10 | 7 | 5 | 4 | 3 | with FMVSS302 is self-extinguishing, and the number of frayed thread at the end part after 100 repetitions of a scrub test in accordance with ISO5981 is 5 or less;
the polyamide-based thermoplastic resin composition further comprises an adhesion aid (E) and an adhesion aid reaction catalyst (F); and
a mixing amount as a solid content of the adhesion aid (E) relative to 100 parts by mass of the polyamide-based thermoplastic resin composition is 5 to 10 parts by mass.

2. The base fabric for an airbag according to claim 1, wherein the polyamide-based thermoplastic resin composition has a resin film strength of not less than 10 MPa and not more than 17 MPa, and a break elongation of not less than 900% and not more than 1300% in a film product made of the polyamide-based thermoplastic resin composition.

3. The base fabric for an airbag according to 2, wherein the polyamide-based thermoplastic resin composition comprises a polyamide elastomer resin (A), an antioxidant (B), a reactive compound (C) and a crosslinking agent (D).

4. The base fabric for an airbag according to claim 1, wherein the polyamide-based thermoplastic resin composition comprises a polyamide elastomer resin (A), an antioxidant (B), a reactive compound (C) and a crosslinking agent (D).

5. The base fabric for an airbag according to claim 4, wherein the polyamide-based thermoplastic resin composition further comprises a pigment (G).

6. The base fabric for an airbag according to claim 5, wherein a solid concentration of the polyamide elastomer resin (A) and the antioxidant (B) in the polyamide-based thermoplastic resin composition is 15 to 35 mass %, and a mixing amount as a solid content of each of the reactive compound (C) and the crosslinking agent (D) relative to 100 parts by mass of the polyamide-based thermoplastic resin composition is as follows:
the reactive compound (C): 1 to 5 parts by mass, and
the crosslinking agent (D): 2 to 4 parts by mass.

7. The base fabric for an airbag according to claim 4, wherein a solid concentration of the polyamide elastomer resin (A) and the antioxidant (B) in the polyamide-based thermoplastic resin composition is 15 to 35 mass %, and a mixing amount as a solid content of each of the reactive compound (C) and the crosslinking agent (D) relative to 100 parts by mass of the polyamide-based thermoplastic resin composition is as follows:
the reactive compound (C): 1 to 5 parts by mass, and
the crosslinking agent (D): 2 to 4 parts by mass.

\* \* \* \* \*